United States Patent
Ho et al.

(10) Patent No.: US 8,594,069 B2
(45) Date of Patent: Nov. 26, 2013

(54) IN-ORDER DATA DELIVERY DURING HANDOVER IN A WIRELESS COMMUNICATION SYSTEM

(75) Inventors: Sai Yiu Duncan Ho, San Diego, CA (US); Francesco Grilli, La Jolla, CA (US); Masato Kitazoe, Hachiouji (JP)

(73) Assignee: QUALCOMM Incorporated, San Diego, CA (US)

( * ) Notice: Subject to any disclaimer, the term of this patent is extended or adjusted under 35 U.S.C. 154(b) by 885 days.

(21) Appl. No.: 12/185,939

(22) Filed: Aug. 5, 2008

(65) Prior Publication Data

US 2009/0061876 A1    Mar. 5, 2009

Related U.S. Application Data

(60) Provisional application No. 60/954,300, filed on Aug. 6, 2007.

(51) Int. Cl.
*H04J 3/24* (2006.01)

(52) U.S. Cl.
USPC .......................................................... 370/349

(58) Field of Classification Search
USPC ......... 370/203, 310–330, 331–334, 335–350, 370/395.1, 395.2, 395.3, 395.4, 395.41, 370/395.42, 395.43, 395.5, 395.62, 370/400–411, 412–418, 458–463, 464–484, 370/503–512
See application file for complete search history.

(56) References Cited

U.S. PATENT DOCUMENTS

| | | | | |
|---|---|---|---|---|
| 6,473,411 B1 * | 10/2002 | Kumaki et al. | ............... | 370/331 |
| 7,567,535 B2 * | 7/2009 | Singh et al. | ................... | 370/331 |
| 7,848,752 B2 * | 12/2010 | Kim et al. | ..................... | 455/436 |
| 7,921,348 B2 * | 4/2011 | Seidel et al. | .................. | 714/751 |
| 2002/0068571 A1 * | 6/2002 | Ohlsson et al. | ............... | 455/442 |
| 2003/0067869 A1 * | 4/2003 | Harris et al. | ................. | 370/217 |
| 2003/0067896 A1 * | 4/2003 | Chuah et al. | .................. | 370/331 |

(Continued)

FOREIGN PATENT DOCUMENTS

| | | |
|---|---|---|
| EP | 0777396 | 6/1997 |
| EP | 1383292 | 1/2004 |
| JP | 2005012718 A | 1/2005 |
| JP | 2008236269 A | 10/2008 |

OTHER PUBLICATIONS

International Search Report—PCT/US2008/072387, International Search Authority—European Patent Office—Dec. 16, 2008.

(Continued)

*Primary Examiner* — Jung-Jen Liu
(74) *Attorney, Agent, or Firm* — John J. Ketchum (57) ABSTRACT

Techniques for performing in-order data delivery during handover in a wireless communication system are described. A user equipment (UE) may perform handover from a source base station to a target base station. The target base station may start a timer after a data path from a gateway to the UE has been switched from the source base station to the target base station. The target base station may receive forwarded packets for the UE from the source base station and may receive new packets for the UE from the gateway. The target base station may send the forwarded packets received prior to expiration of the timer to the UE before any new packets. The target base station may send the forwarded packets to the UE without waiting for the timer to expire and may send the new packets to the UE after the timer expires.

26 Claims, 8 Drawing Sheets

(56) References Cited

U.S. PATENT DOCUMENTS

| | | | |
|---|---|---|---|
| 2005/0007994 A1* | 1/2005 | Fukuzawa et al. | 370/349 |
| 2005/0036462 A1 | 2/2005 | Sillasto et al. | |
| 2005/0237977 A1* | 10/2005 | Sayeedi | 370/331 |
| 2006/0007862 A1* | 1/2006 | Sayeedi et al. | 370/235 |
| 2006/0146753 A1* | 7/2006 | Park et al. | 370/331 |
| 2006/0198341 A1* | 9/2006 | Singh et al. | 370/331 |
| 2008/0076423 A1* | 3/2008 | Lee et al. | 455/436 |
| 2008/0253334 A1* | 10/2008 | Torsner et al. | 370/331 |
| 2010/0017646 A1* | 1/2010 | Nakagawa et al. | 714/4 |
| 2010/0120434 A1* | 5/2010 | Hasegawa | 455/436 |
| 2010/0177739 A1* | 7/2010 | Huang | 370/331 |
| 2010/0278143 A1* | 11/2010 | Chun et al. | 370/331 |

OTHER PUBLICATIONS

Written Opinion—PCT/US2008/072387, International Search Authority—European Patent Office—Dec. 16, 2008.

"DL forwarding and reordering", 3GPP TSG-RAN3#55bis, R3-070539, Mar. 27-30, 2007, St. Julian's, Malta.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2" (Release 8), 3GPP TS 36.300 V8.6.0 (Sep. 2008).

"3rd Generation Partnership Project; Technical Specification Group Radio Access Network; Radio Interface Protocol Architecture" (Release 8), 3GPP TS 25.301 V8.3.0 (Sep. 2008).

Dorot, V., et al., "An Explanatory Dictionary of Modern Computer Terms," 2nd Edition, bhv, Saint Petersburg, 2001, 'Program Product' on p. 339.

3GPP TS 36.300 V8.1.0(Jun. 2007),3rd Generation Partnership Project;Technical Specification Group Radio Access Network;Evolved Universal Terrestrial Radio Access (E-UTRA) and Evolved Universal Terrestrial Radio Access Network (E-UTRAN); Overall description; Stage 2 (Release 8)pp. 1-106.

Samsung, method to release resources at source ENB during handover, 3GPP TSG_RAN WG3 #53 meeting, R3-061032, Tallinn, Aug. 28, 2001-Sep. 1, 2006 (http://www.3gpp.org/ftp/tsg_ran/WG3_lu/TSGR3_53/docs/R3-061062.zip).

Samsung,"A method to release source resources during handover", 3GPP TSG-RAN WG3 #54 meeting R3-061678, Nov. 6, 2006, pp. 1-3, URL, http://www.3gpp.org/ftp/tsg_ran/WG3_lu/TSGR3_54/docs/R3-061678.zip.

Taiwan Search Report—TW097129968—TIPO—May 15, 2012.

* cited by examiner

IN-ORDER DATA DELIVERY DURING HANDOVER IN A WIRELESS COMMUNICATION SYSTEM

The present application claims priority to provisional U.S. Application Ser. No. 60/954,300, entitled "IN-ORDER DATA DELIVERY DURING HANDOVER IN A WIRELESS COMMUNICATION SYSTEM," filed Aug. 6, 2007, assigned to the assignee hereof and incorporated herein by reference.

BACKGROUND

I. Field

The present disclosure relates generally to communication, and more specifically to techniques for sending data to a user equipment (UE) during handover in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include any number of base stations that can support communication for any number of UEs. A UE may be mobile and may be handed over from a source base station to a target base station when the UE moves about the system. During the handover, the source base station may have data that has not been sent to the UE, and the system may also have new data to send to the UE. It may be desirable to send the unsent data from the source base station and the new data from the system in the proper order and as quickly and efficiently as possible.

SUMMARY

Techniques for performing in-order data delivery during handover in a wireless communication system are described herein. A UE may perform handover from a source base station to a target base station. The source base station may forward packets for the UE to the target base station. The forwarded packets may include packets not yet sent to the UE as well as packets in transit. The target base station may also receive new packets for the UE from a gateway.

In an aspect, the target base station may start a timer after a data path from the gateway to the UE has been switched from the source base station to the target base station. The timer may be set to a fixed value or a configurable value, which may be determined or updated based on various factors. The timer may be started upon receiving (i) a first new packet for the UE from the gateway or (ii) a message indicating completion of the switching of the data path. The target base station may send the forwarded packets received prior to expiration of the timer to the UE before any new packets. The target base station may send the forwarded packets to the UE without waiting for the timer to expire and may send the new packets to the UE after the timer expires. This may ensure in-order delivery of the forwarded and new packets to the UE.

Various aspects and features of the disclosure are described in further detail below.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for LTE, and LTE terminology is used in much of the description below.

Figure 1:
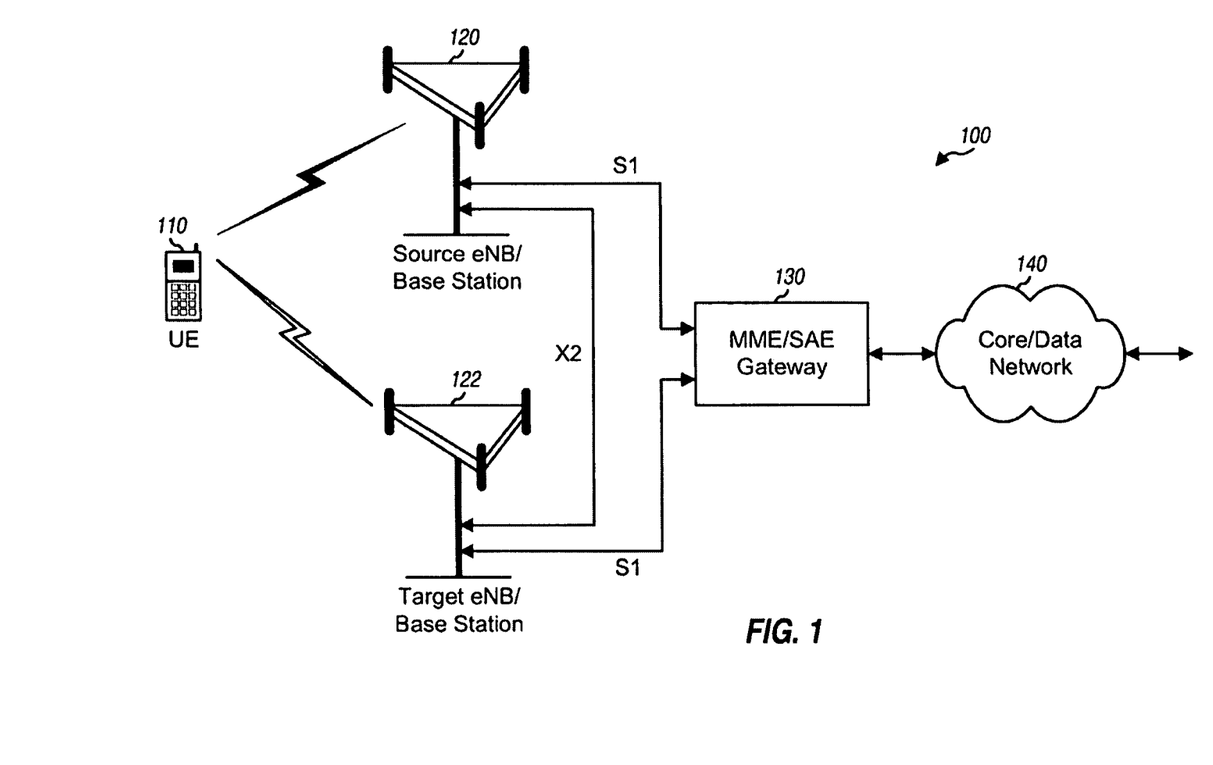
FIG. 1 shows a wireless communication system.

FIG. 1 shows a wireless communication system 100, which may be an LTE system. System 100 may include evolved Node Bs (eNBs) and other network entities described by 3GPP. For simplicity, only two eNBs 120 and 122 and one Mobility Management Entity/System Architecture Evolution (MME/SAE) gateway 130 are shown in FIG. 1. An eNB may be a fixed station that communicates with the UEs and may also be referred to as a Node B, a base station, an access point, etc. An eNB may provide enhanced functionality over conventional base stations such as, e.g., mobility management. The coverage area of an eNB may be partitioned into multiple (e.g., three) smaller areas. In 3GPP, the term "cell" can refer to the smallest coverage area of an eNB and/or an eNB subsystem serving this coverage area. In 3GPP2, the term "sector" can refer to the smallest coverage area of a base station and/or a base station subsystem serving this coverage area. For clarity, 3GPP concept of cell is used in the description below.

eNBs 120 and 122 may communicate with each other via an X2 interface, which may be a logical or physical interface. eNBs 120 and 122 may communicate with SAE gateway 130 via an S1 interface. SAE gateway 130 may support data services such as packet data, Voice-over-IP (VoIP), video, messaging, etc. SAE gateway 130 may also be referred to as an access gateway, a packet data network (PDN) gateway, a Gateway GPRS Support Node (GGSN), a Packet Data Serving Node (PDSN), etc. SAE gateway 130 may couple to a core and/or data network 140 (e.g., the Internet) and may communicate with other entities (e.g., remote servers and terminals) that couple to core/data network 140. The functions of eNBs 120 and 122 and SAE gateway 130 are described in 3GPP TS 36.300, entitled "Evolved Universal Terrestrial Radio Access (E-UTRA) and Evolved Universal Terrestrial Radio Access Network (E-UTRAN); Overall description; Stage 2," which is publicly available.

A UE 110 may communicate with eNB 120 and/or eNB 122 via the downlink and uplink. The downlink (or forward link) refers to the communication link from an eNB to a UE, and the uplink (or reverse link) refers to the communication link from the UE to the eNB. UE 110 may be stationary or mobile and may also be referred to as a mobile station, a terminal, an access terminal, a subscriber unit, a station, etc. UE 110 may be a cellular phone, a personal digital assistant (PDA), a wireless modem, a wireless communication device, a handheld device, a laptop computer, a cordless phone, etc.

Figure 2:
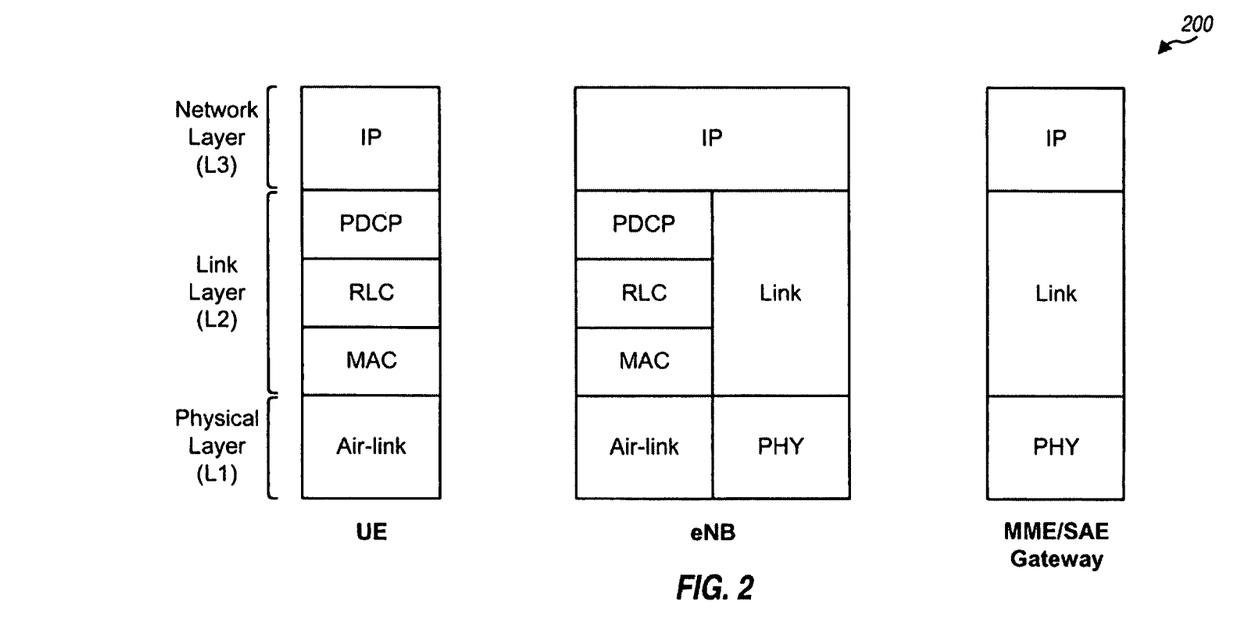
FIG. 2 shows example protocol stacks at various entities.

FIG. 2 shows example protocol stacks 200 for a user plane in LTE. The user plane carries traffic data between UE 110 and SAE gateway 130 via a serving eNB, which may be eNB 120 or 122. Each entity maintains a protocol stack for communication with another entity. Each protocol stack typically includes a network layer (L3), a link layer (L2), and a physical layer (L1). The UE and the SAE gateway may exchange data using Internet Protocol (IP) at the network layer. Higher layer data for Transmission Control Protocol (TCP), User Datagram Protocol (UDP), and/or other protocols may be encapsulated in IP packets, which may be exchanged between the UE and the SAE gateway via the serving eNB.

The link layer is typically dependent on wireless network technology. For the user plane in LTE, the link layer for the UE is composed of three sublayers for Packet Data Convergence Protocol (PDCP), Radio Link Control (RLC), and Medium Access Control (MAC), which are terminated at the serving eNB. The UE father communicates with the serving eNB via E-UTRA air-link interface at the physical layer. The serving eNB may communicate with the SAE gateway via IP and a technology-dependent interface for the link and physical layers.

The protocol stack at each entity includes a transmit path and a receive path. In the transmit path, each layer/sublayer may receive service data units (SDUs) from the next higher layer/sublayer and may generate protocol data units (PDUs) for the next lower layer/sublayer. A PDU sent from a given layer/sublayer may be an SDU received at the next lower layer/sublayer. For a given layer/sublayer, there may or may not be a one-to-one mapping between SDUs and PDUs for that layer. In the receive path, each layer/sublayer may receive PDUs from the next lower layer/sublayer and may provide SDUs to the next higher layer/sublayer. The protocols in the link layer may provide various functions. The functions of PDCP, RLC and MAC are described in the aforementioned 3GPP TS 36.300 and in 3GPP TS 25.301, entitled "Technical Specification Group Radio Access Network; Radio Interface Protocol Architecture," which is publicly available. A PDU or an SDU may also be referred to as a packet.

Referring back to FIG. 1, UE 110 may initially communicate with eNB 120 for data exchanges with SAE gateway 130. UE 110 may be mobile and may perform handover from eNB 120 to eNB 122. For the handover, eNB 120 may be referred to as a source eNB, and eNB 122 may be referred to as a target eNB. After the handover, UE 110 may communicate with eNB 122 for data exchanges with SAE gateway 130. eNB 120 may be a serving eNB for UE 110 prior to the handover, and eNB 122 may be the serving eNB for the UE after the handover.

Figure 3:
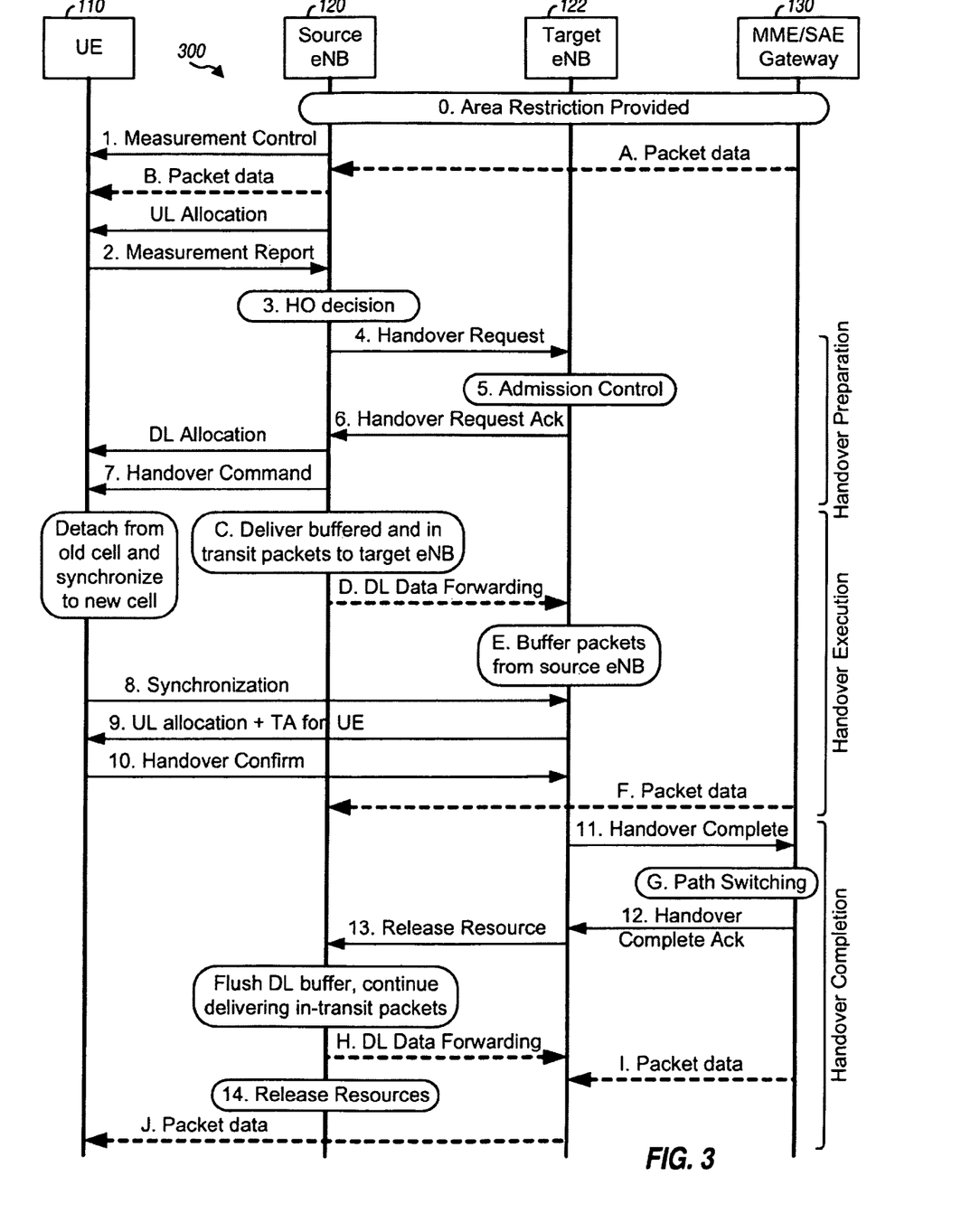
FIGS. 3 and 4 show two example call flows for handover of a UE.

FIG. 3 shows an example call flow 300 for handover of UE 110 from source eNB 120 to target eNB 122. The source eNB may configure measurement procedures for the UE (step 1), and the UE may send measurement reports to the source eNB (step 2). The source eNB may make a decision to handover (HO) the UE (step 3) and may issue a Handover Request message to the target eNB (step 4). The target eNB may perform admission control and may accept the handover of the UE (step 5). The target eNB may then return a Handover Request Acknowledgement (Ack) message to the source eNB (step 6). The source eNB may then send a Handover Command message to the UE (step 7).

Prior to the handover, the source eNB may receive data for the UE from the SAE gateway (step A) and may send the data to the UE (step B). After sending the Handover Command message in step 7, the source eNB may forward buffered data for the UE to the target eNB (steps C and D). The forwarded data may include data that has not been sent to the UE as well as data that is in transit, e.g., sent but not successfully received by the UE. The target eNB may buffer the data received from the source eNB (step E).

Upon receiving the Handover Command in step 7, the UE may detach from the source eNB and may synchronize to the target eNB. The UE may perform synchronization to the target eNB and may start acquiring uplink timing advance (step 8). The target eNB may respond with resource allocation and timing advance (TA) for the UE (step 9). Once the UE has successfully accessed the target eNB, the UE may send a Handover Confirm message to the target eNB to indicate that the handover procedure is completed for the UE (step 10).

The target eNB may send a Handover Complete message to inform the MME/SAE gateway that the UE has changed eNB (step 11). The MME/SAE gateway may then switch a data path for the UE from the source eNB to the target eNB (step G). The MME/SAE gateway may also return a Handover Complete Ack message to the target eNB (step 12). The target, eNB may send a Release Resource message to the source eNB to indicate successful handover of the UE step 13). Upon receiving the Release Resource message, the source eNB may release resources for the UE (step 14).

Prior to receiving the Handover Complete message in step 11, the MME/SAE gateway may continue to send data for the UE to the source eNB (step F). The source eNB may continue to forward data for the UE to the target eNB (step H). After receiving the Handover Complete message in step 11, the MME/SAE gateway may send data for the UE to the target eNB (step 1). The target eNB may send the data forwarded from the source eNB and the data received from the MME/SAE gateway to the UE (step J).

Figure 4:
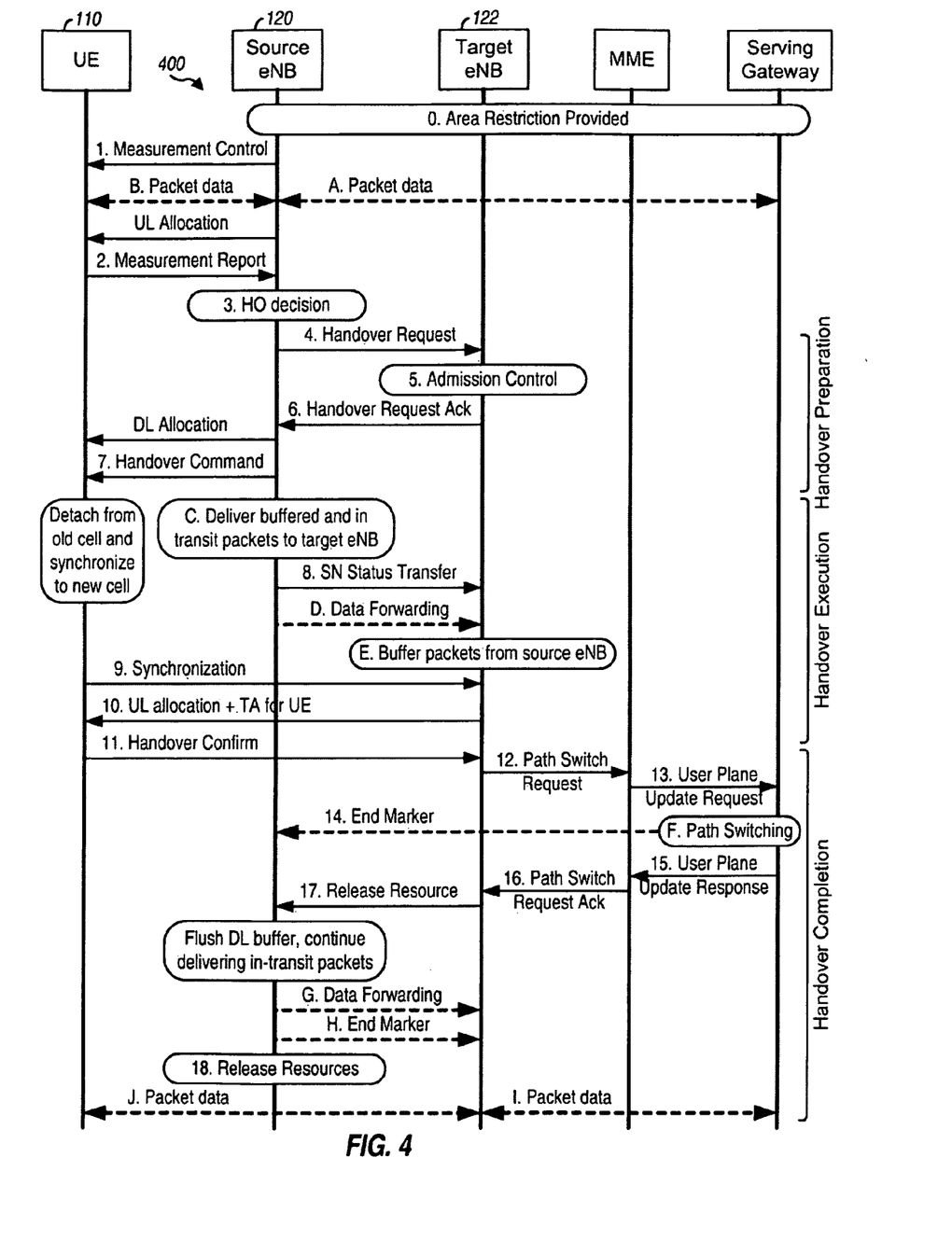

FIG. 4 shows another example call flow 400 for handover of UE 110 from source eNB 120 to target eNB 122. In this example, the MME and SAE gateway are separate entities. Steps 1 through 7 of call flow 400 may correspond to steps 1 through 7, respectively, of call flow 300 in FIG. 3.

After sending the Handover Command message in step 7, the source eNB may send an SN Status Transfer message that may convey the transmitter and receiver status for PDCP for the UE at the source eNB (step 8). The status information may include (i) the PDCP sequence number (SN) of the last PDCP SDU received in sequence at the source eNB and (ii) the next PDCP SN to use for data to send to the UE. The target eNB may use the transmitter and receiver status information to preserve PDCP status for the UE.

Steps 9 through 11 of call flow 400 may correspond to steps 8 through 10, respectively, of call flow 300 in FIG. 3. After receiving the Handover Confirm message from the UE in step 11, the target eNB may send a Path Switch Request message to the MME to inform the MME, that the UE has changed eNB (step 12). The MME may send a User Plane Update Request message to the SAE gateway (step 13).

The SAE gateway may then switch the data path for the UE from the source eNB to the target eNB (step F). The SAE gateway may also send one or more "end marker" packets to the source eNB and may then release resources towards the source eNB (step 14). An end marker packet may contain no user data and may indicate the end of data sent from the SAE gateway to the source eNB. The SAE gateway may also return a User Plane Update Response message to the MME (step 15). The MME may return a Path Switch Request Ack message to the target eNB to confirm the Patch Switch Request message (step 16). The target eNB may send a Release Resource message to the source eNB to indicate successful handover of the UE (step 17). Upon receiving the Release Resource message, the source eNB may release resources for the UE (step 18).

Prior to the handover, the source eNB may receive data for the UE from the SAE gateway (step A) and may send the data to the UE (step B). After sending the Handover Command message in step 7, the source eNB may forward buffered data for the UE to the target eNB (steps C and D), and the target eNB may buffer the forwarded data (step E). During switching of the data path to the target eNB, the source eNB may receive one or more end marker packets from the SAE gateway (step 14). The source eNB may continue to forward data for the UE to the target eNB (step G) and may send an end marker packet when all of the data for the UE has been forwarded (step H). The target eNB may send the data forwarded from the source eNB and the data received from the MME/SAE gateway to the UE (step J).

FIGS. 3 and 4 show two example call flows for handover of the UE from the source eNB to the target eNB. Handover of the UE may also be performed with other call flows.

Figure 5:
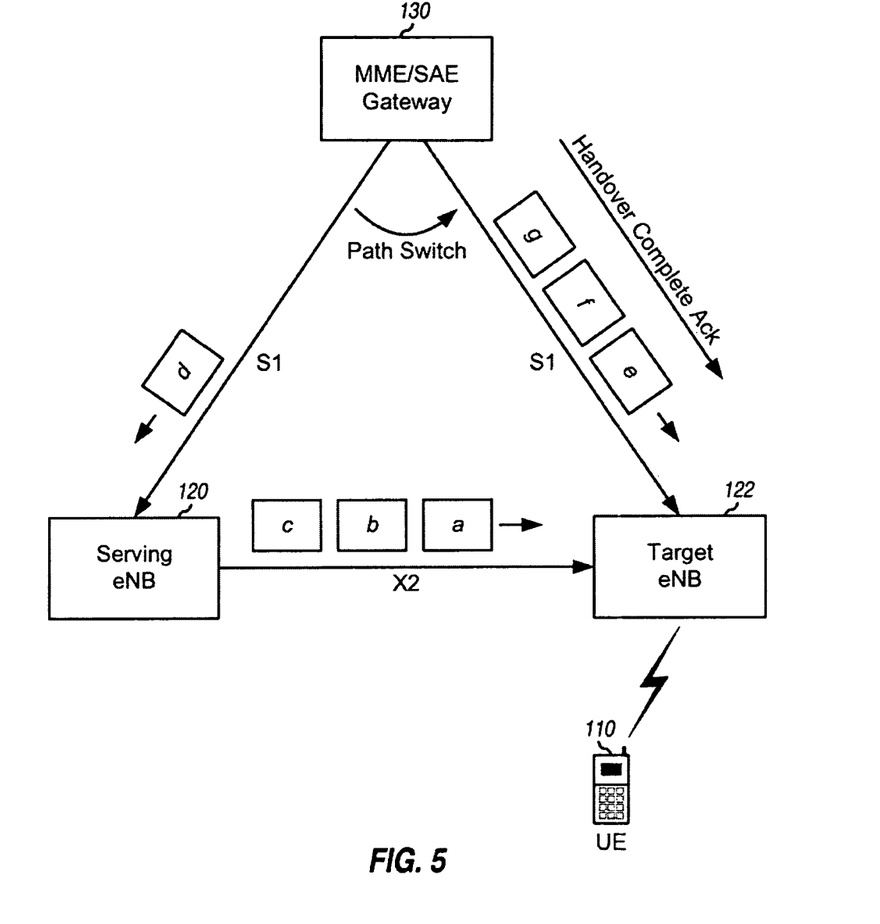
FIG. 5 shows forwarding of packets for the UE during handover.

FIG. 5 shows forwarding of packets (e.g., PDCP SDUs) for the UE on the downlink during handover. Prior to the handover, the SAE gateway may send packets for the UE to the source eNB via the S1 interface (step A in FIG. 4). The source eNB may buffer, process and transmit these packets to the UE (step B in FIG. 4). At some point during the handover, the data path for the UE is switched from the source eNB to the target eNB (step F in FIG. 4). From this point onward, the SAE gateway may send packets for the UE to the target eNB via the S1 interface (step 1 in FIG. 4). The SAE gateway may send the packets for the UE in order to the source and target eNBs. During and after the handover, the source eNB may have some packets for the UE that have not yet been sent to the UE. The source eNB may forward these packets to the target eNB via the X2 interface (steps D and G in FIG. 4).

The target eNB may receive packets for the UE from the SAE gateway as well as the source eNB. The target eNB may receive these packets out of order from the SAE gateway and the source eNB, e.g., due to additional delay for transmission via the X2 interface. In the example shown in FIG. 5, the packets may be ordered such that packet a is the earliest and packet g is the latest. The target eNB may receive packets e, f and g from the SAE gateway before packets a, b, c and d from the source eNB.

The target eNB may be responsible for in-order delivery of the packets to the UE during and after handover. The target eNB may send all of the packets forwarded from the source eNB before sending any of the packets received from the SAE gateway. When the target eNB receives the first packet e from the SAE gateway, the target eNB may somehow ensure that there are no more packets forwarded from the source eNB before transmitting packet e to the UE.

However, the target eNB may not know when the last packet will be received from the source eNB. In call flow 300 in FIG. 3, the source eNB continues to forward packets for the UE to the target eNB until all packets have been forwarded. The target eNB does not know when the last packet for the UE has been forwarded by the source eNB. In call flow 400 in FIG. 4, the source eNB may send an end marker packet to indicate that all packets for the UE have been forwarded to the target eNB. However, the end marker packet may be lost during transit and may not be received by the target eNB.

In an aspect, the target eNB may use a timer to determine how long to wait for packets for the UE from the source eNB prior to sending packets received from the SAE gateway to the UE. The target eNB may start the timer when it first "hears" from the SAE gateway regarding the UE, which may occur after the data path switching in step G in FIG. 3 or step F in FIG. 4. The timer may be started based on one of the following events:

When the target eNB receives the first packet for the UE from the SAE gateway,

When the target eNB receives the Handover Complete Ack message from the SAE gateway, e.g., step 12 in FIG. 3, When the target eNB receives the Path Switch Request Ack message from the MME, e.g., step 16 in FIG. 4, or When the earliest of any of the above events occurs.

The Handover Complete Ack message in step 12 of FIG. 3 and the Path Switch Request Ack message in step 16 of FIG. 4 may be considered as two example messages indicating completion of the data path switching from the source eNB to the target eNB. The completion of the data path switching may also be conveyed to the target eNB in other manners.

In FIG. 3, the target eNB should receive the Handover Complete Ack message and the first packet for the UE from the SAE gateway close in time but may receive these two items in different orders because of the asynchronous nature of the S1 interface. In FIG. 4, the target eNB should receive the Path Switch Request Ack message from the MME and the first packet for the UE from the SAE gateway close in time. The data path switching in step G in FIG. 3 and step F in FIG. 4 may take a variable amount of time to complete. By starting the timer after completion of the data path switching, the variable path switching delay may be avoided, which may allow for use of a shorter timer value:

In another aspect, regardless of when the timer may be started, the timer may be adaptive and set to a suitable value in order to reduce packet delay and packet loss. In one design, the timer value may be determined based on one or more of the following factors:

1. Load experienced on the X2 interface between the source and target eNBs,
2. Load experienced on the S1 interface between the source eNB and the SAE gateway and/or the S1 interface between the target eNB and the SAE gateway,
3. Past experience,
4. How long it took to receive the last forwarded packets from the source eNB in previous handovers, e.g., median, average, variance, etc.,
5. Cell specific factors, e.g., function of cell size, system bandwidth, hysteresis values, etc., 6. Radio bearer specific factors, e.g., function of delay requirement, maximum bit rate (MBR), guaranteed bit rate (GBR), etc., and 7. Typical maximum delay that can be accepted by common TCP applications.

For factor 1, a longer timer value may be used for higher load on the X2 interface, and vice versa. The longer timer value may provide more time to receive packets forwarded from the source eNB. For factor 2, a longer timer value may be used for higher load on the S1 interface between the source eNB and the SAE gateway, and vice versa. A more congested S1 interface may result in packets taking longer to arrive at the source eNB and finally to the target eNB.

For factors 3 and 4, the timer value may be selected based on information obtained for prior handovers of UEs from the source eNB to the target eNB. For each handover, the target eNB may determine when the last forwarded packet was received from the source eNB. The target eNB may discard the last forwarded packet if it was received after expiration of the timer, which would indicate that the timer was set too short. Conversely, if the last forwarded packet was received well before the timer expired, then the timer was set too long. This information may be used to set the timer to the proper value for future handovers. For factor 5, the cell specific factors may affect delay on the S1 interface, which may in turn affect the forwarding of packets.

In one design, a single timer value may be used for all UEs handed over to the target eNB. In another design, different timer values may be used for different source eNBs, one timer value for each source eNB. In yet another design, different timer values may be used for different types of traffic data or flows, which may be determined based on characteristics of the radio bearers for the flows (factor 6 above). For example, a shorter timer value may be used for flows with delay-sensitive data (e.g., VoIP), and a longer timer value may be used for delay-tolerant data (e.g., background download).

In general, the timer value may be selected based on any one or more factors such that the amount of delay introduced by the timer can be reduced as much as possible while avoiding or reducing loss of packets forwarded from the source eNB. Some factors are given above, and other factors may also be considered in selecting the timer value. Different values may be used for the timer for different quality-of-service (QoS) profiles. A QoS profile may be associated with delay requirement, throughput requirement, priority, and/or data handling parameters.

In one design, the timer value may be dynamically updated as follows:

$$T(k) \begin{cases} = T(k-1) + \Delta_{UP} & \text{if } D(k) > T(k-1) \\ = T(k-1) - \Delta_{DN} & \text{if } D(k) \le T(k-1) \end{cases}$$

Where:

D(k) is the delay of the last packet forwarded by the source eNB for the k-th handover to the target eNB, T(k) is the timer value after the k-th handover, and $\Delta_{UP}$ is an up step and $\Delta_{DN}$ is a down step for adjusting the timer value.

The up and down steps may be defined as follows:

$$\Delta_{DN} = \Delta_{UP} \cdot \left(\frac{100-Q}{Q}\right), \quad \text{Eq (2)}$$

where Q is the percentage of handovers in which the last forwarded packets are received before expiration of the timer.

$\Delta_{DN}$ may be a small fraction of $\Delta_{UP}$. For example, if Q=99%, then $\Delta_{DN}=\Delta_{UP}/99$. The value of $\Delta_{UP}$ may be selected based on a tradeoff between convergence rate and residual estimation error. A larger value of $\Delta_{UP}$ may provide faster convergence whereas a smaller value of $\Delta_{UP}$ may provide smaller residual estimation errors.

In the design shown in equation (1), the timer value may be dynamically updated for each handover to the target eNB. If the delay of the last packet forwarded from the source eNB is greater than the current timer value, then the timer value is increased by the larger up step of $\Delta_{UP}$. Otherwise, the timer value is decreased by the smaller down step of $\Delta_{DN}$. The timer value should converge to the point where Q percents of handovers have the last packet forwarded within the timer value, and 100-Q percents of handovers have the last packet forwarded later than the timer value. Q may be selected to achieve the desired packet loss performance at handovers and may be equal to 80, 90, 95, 99 or some other value.

In one design, the target eNB may (i) send all packets received from the source eNB before the timer expires to the UE and (ii) discard all packets received from the source eNB after the timer expires. This design may simplify the implementation of the timer and the operation of the target eNB. In another design, the target eNB may continue to receive packets from the source eNB even after the timer expires and may send these packets to the UE if the first packet from the SAE gateway has not been sent by the target eNB to the UE. In this design, the target eNB may continue to send packets received from the source eNB to the UE even after the timer has expired and until the first packet from the SAE gateway is sent by the target eNB to the UE.

In general, the techniques described herein may be used to provide in-order delivery of packets for any protocol at any layer or sublayer from the target eNB to the UE during handover. For example, the techniques may be used to provide in-order delivery of PDCP SDUs, IP packets, etc.

Figure 6:
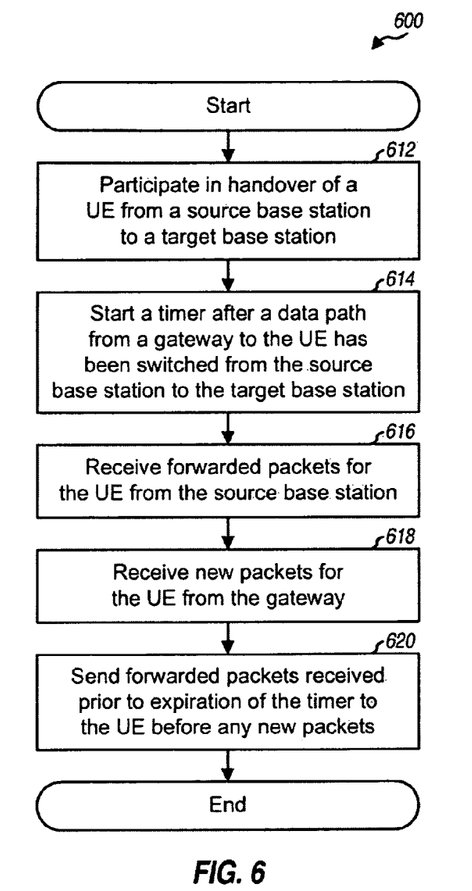
FIG. 6 shows a process for in-order data delivery during handover.

FIG. 6 shows a design of a process 600 for in-order data delivery during handover. Process 600 may be performed by a target base station, e.g., a target eNB. The target base station may participate in handover of a UE from a source base station to the target base station, e.g., as shown in FIG. 3 or 4 (block 612). Block 612 may include the tasks performed for handover by the target base station in FIG. 3 or 4 or some other set of tasks. The target base station may start a timer after a data path from a gateway to the UE has been switched from the source base station to the target base station (block 614). The gateway may be an SAE gateway, a GGSN, a PDSN, etc.

The target base station may receive forwarded packets for the UE from the source base station (block 616). A forwarded packet may be a packet sent by the gateway to the source base station and forwarded by the source base station to the target base station. The target base station may also receive new packets for the UE from the gateway (block 618). A new packet may be a packet sent by the gateway to the target base station but not to the source base station. The forwarded and new packets may comprise PDCP SDUs, IP packets, or some other type of packets.

The target base station may send forwarded packets received prior to expiration of the timer to the UE before any new packets (block 620). The target base station may send the forwarded packets to the UE without waiting for expiration of the timer and may send the new packets to the UE after expiration of the timer. In one design, the target base station may discard forwarded packets received after expiration of the timer. In another design, the target base station may send the forwarded packets received after expiration of the timer to the UE if no new packets have been sent to the UE. The target base station may receive from the source base station an end marker packet indicating no more packets to forward to the target base station, e.g., as shown in FIG. 4. In this case, the target base station may terminate the timer upon receiving the end marker packet and may send the new packets to the UE after terminating the timer.

For block 614, the target base station may use a fixed value for the timer. Alternatively, the target base station may determine a configurable value for the timer based on (i) load on a first interface between the source and target base stations, (ii) load on a second interface between the source base station and the gateway, (iii) load on a third interface between the target base station and the gateway, (iv) information for the last forwarded packets for prior handovers of other UEs, (v) QoS profile of data being sent to the UE, and/or (vi) other information. The target base station may also dynamically update the value for the timer based on delays of the last forwarded packets for the prior handovers of other UEs, e.g., as shown in equation (1).

The target base station may send a first message to initiate switching of the data path from the source base station to the target base station and may receive a second message indicating completion of the switching of the data path. For block 614, the target base station may start the timer (i) upon receiving the second message, (ii) upon receiving a first new packet for the UE from the gateway, (iii) upon occurrence of the earlier of events (i) and (ii), or (iv) upon occurrence of some other event. The first message may comprise a Handover Complete message, and the second message may comprise a Handover Complete Ack message, as shown in FIG. 3. The first message may also comprise a Path Switch Request message, and the second message may comprise a Path Switch Request Ack message, as shown in FIG. 4. The first and second messages may also comprise other messages.

Figure 7:
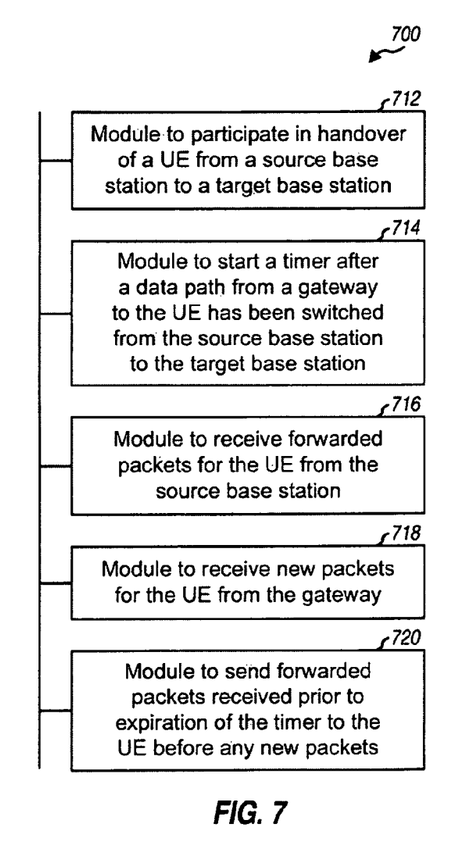
FIG. 7 shows an apparatus for in-order data delivery during handover.

FIG. 7 shows a design of an apparatus 700 for in-order data delivery during handover. Apparatus 700 includes a module 712 to participate in handover of a UE from a source base station to a target base station, a module 714 to start a timer after a data path from a gateway to the UE has been switched from the source base station to the target base station, a module 716 to receive forwarded packets for the UE from the source base station, a module 718 to receive new packets for the UE from the gateway, and a module 720 to send forwarded packets received prior to expiration of the timer to the UE before any new packets.

Figure 8:
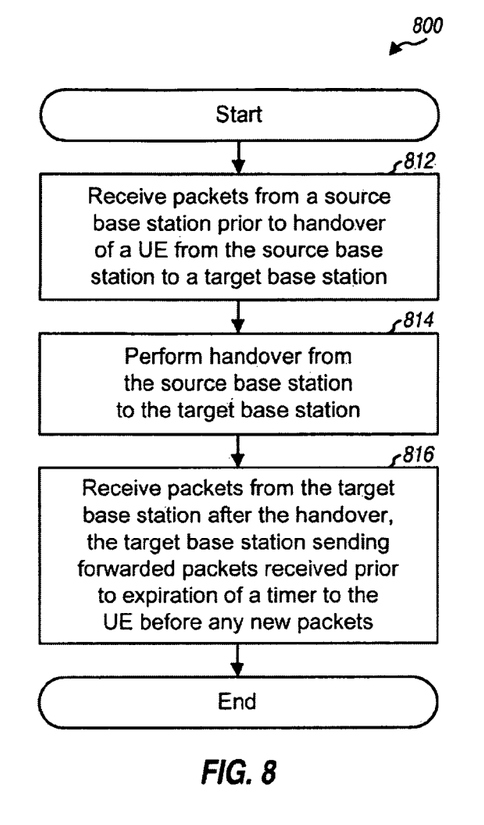
FIG. 8 shows a process for receiving data in order during handover.

FIG. 8 shows a design of a process 800 for receiving data during handover. Process 800 may be performed by a UE. The UE may receive packets from a source base station prior to handover of the UE from the source base station to a target base station (block 812). The UE may perform handover from the source base station to the target base station, e.g., as shown in FIG. 3 or 4 (block 814). The UE may receive packets from the target base station after the handover (block 816). The target base station may start a timer after a data path from a gateway to the UE has been switched from the source base station to the target base station. The target base station may receive forwarded packets for the UE from the source base station and new packets for the UE from the gateway. The target base station may send forwarded packets received prior to expiration of the timer to the UE before any new packets. The UE may receive forwarded packets from the target base station prior to expiration of the timer and may receive new packets from the target base station after expiration of the timer.

Figure 9:
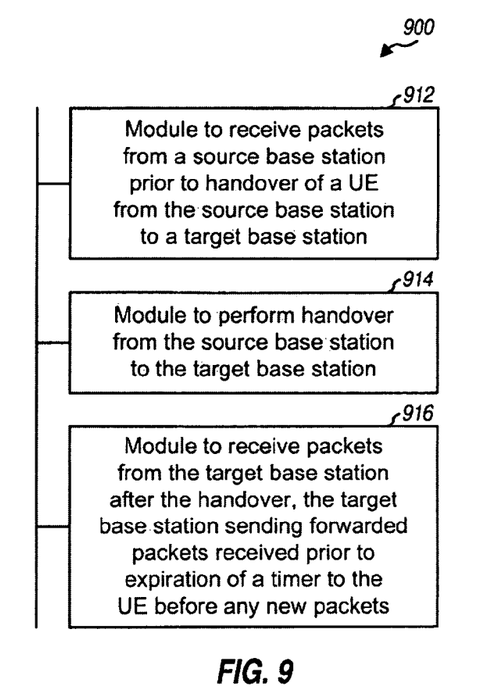
FIG. 9 shows an apparatus for receiving data in order during handover.

FIG. 9 shows a design of an apparatus 900 for receiving data during handover. Apparatus 900 includes a module 912 to receive packets from a source base station prior to handover of a UE from the source base station to a target base station, a module 914 to perform handover from the source base station to the target base station, and a module 916 to receive packets from the target base station after the handover, with the target base station sending forwarded packets received from the source base station prior to expiration of a timer to the UE before any new packets received from the gateway.

The modules in FIGS. 7 and 9 may comprise processors, electronics devices, hardware devices, electronics components, logical circuits, memories, etc., or any combination thereof.

Figure 10:
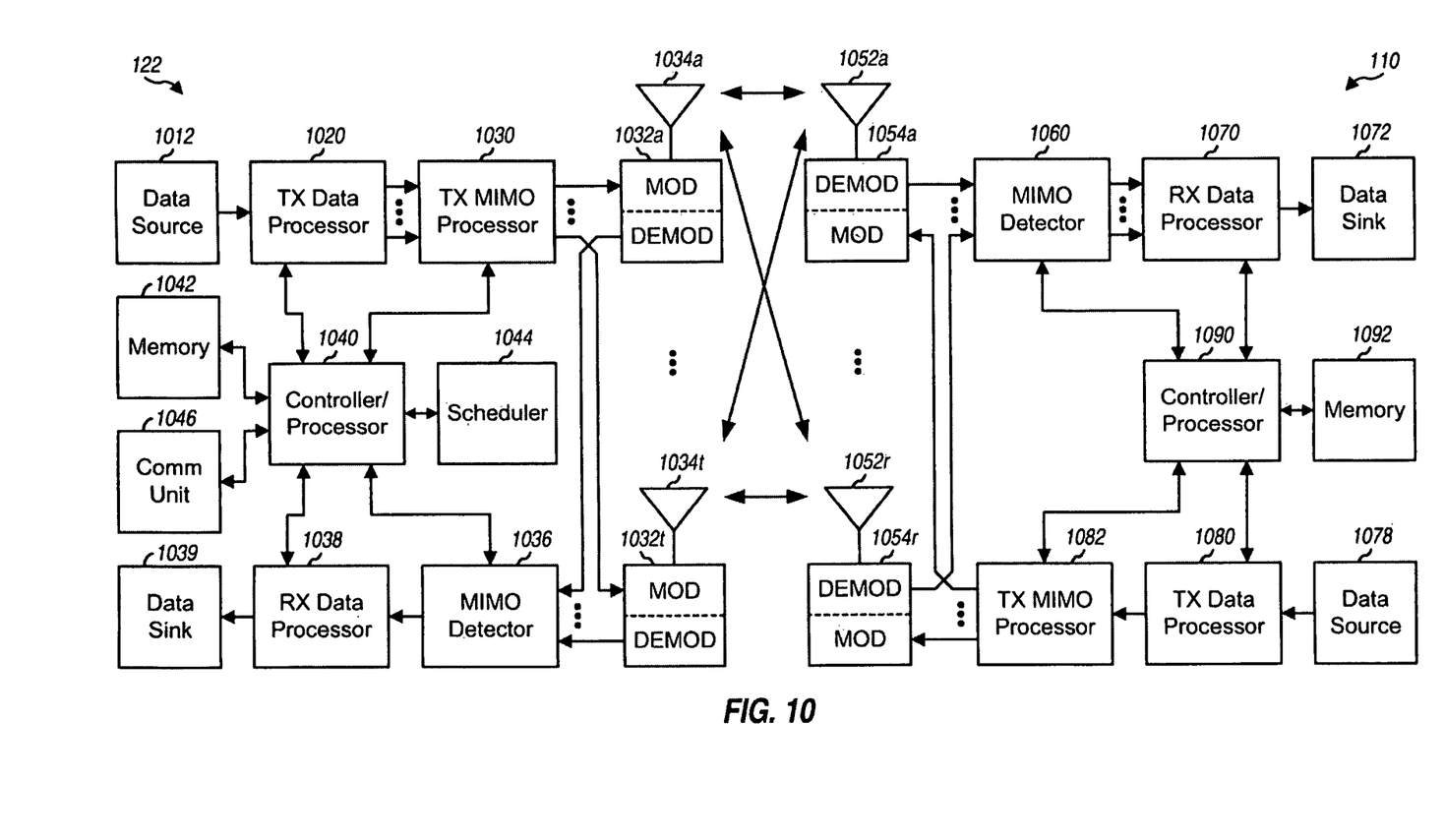
FIG. 10 shows a block diagram of a base station and a UE.

FIG. 10 shows a block diagram of a design of target eNB/base station 122 and UE 110. In this design, eNB 122 is equipped with T antennas 1034a through 1034t, and UE 110 is equipped with R antennas 1052a through 1052r, where in general $T \geq 1$ and $R \geq 1$.

At eNB 122, a transmit (TX) data processor 1020 may receive data for one or more UEs from a data source 1012. TX data processor 1020 may process (e.g., encode, interleave, and modulate) the data for each UE based on one or more coding and modulation schemes selected for that UE to obtain data symbols. A TX multiple-input multiple-output (MIMO) processor 1030 may multiplex the data symbols for all UEs with pilot symbols, process (e.g., precode) the multiplexed symbols, and provide T output symbol streams to T modulators (MODs) 1032a through 1032t. Each modulator 1032 may process a respective output symbol stream, e.g., for orthogonal frequency division multiplexing (OFDM), to obtain an output sample stream. Each modulator 1032 may further process (e.g., convert to analog, amplify, filter, and upconvert) the output sample stream to obtain a downlink signal. T downlink signals from modulators 1032a through 1032t may be transmitted via T antennas 1034a through 1034t, respectively.

At UE 110, antennas 1052a through 1052r may receive the downlink signals from eNB 122 and provide received signals to demodulators (DEMODs) 1054a through 1054r, respectively. Each demodulator 1054 may condition (e.g., filter, amplify, downconvert, and digitize) a respective received signal to obtain samples and may further process the samples (e.g., for OFDM) to obtain received symbols. A MIMO detector 1060 may perform MIMO detection on the received symbols from all R demodulators 1054a through 1054r and provide detected symbols. A receive (RX) data processor 1070 may process (e.g., demodulate, deinterleave, and decode) the detected symbols and provide decoded data for UE 110 to a data sink 1072. In general, the processing by MIMO detector 1060 and RX data processor 1070 is complementary to the processing by TX MIMO processor 1030 and TX data processor 1020 at eNB 122.

On the uplink, at UE 110, data from a data source 1078 and signaling may be processed by a TX data processor 1080, further processed by a TX MIMO processor 1082 (if applicable), conditioned by modulators 1054a through 1054r, and transmitted via antennas 1052a through 1052r. At eNB 122, the uplink signals from UE 110 may be received by antennas 1034, conditioned by demodulators 1032, detected by a MIMO detector 1036, and processed by an RX data processor 1038 to obtain the data and signaling transmitted by UE 110.

Controllers/processors 1040 and 1090 may direct the operation at eNB 122 and UE 110, respectively. Controller/processor 1040 may implement or direct process 600 in FIG. 6 and/or other processes for the techniques described herein. Controller/processor 1090 may implement or direct process 800 in FIG. 8 and/or other processes for the techniques described herein. Memories 1042 and 1092 may store data and program codes for eNB 122 and UE 110; respectively. A scheduler 1044 may schedule UEs for downlink and/or uplink transmission and may provide assignments of resources for the scheduled UEs. A communication (Comm) unit 1046 may support communication with other network entities such as source eNB 120 via the X2 interface and SAE gateway 130 via the S1 interface.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different, technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for a target base station of a wireless communication system during handover of user equipment (UE) from a source base station to the target base station, comprising:

determining a value for a timer based on at least one of load on a first interface between the source base station and the target base station, load on a second interface between the source base station and a gateway, load on a third interface between the target base station and the gateway, information for last forwarded packets for prior handovers of other UEs, and quality-of-service (QoS) profile of data being sent to the UE;

starting the timer in the target base station after a data path from the gateway to the UE has been switched from the source base station to the target base station;

receiving forwarded packets for the UE from the source base station;

receiving new packets for the UE from the gateway;

sending forwarded packets received prior to expiration of the timer to the UE before any new packets; and terminating the timer upon receiving an end marker packet from the source base station.

2. The method of claim 1, wherein the starting the timer comprises starting the timer upon receiving a first new packet for the UE from the gateway.

3. The method of claim 1, further comprising:

sending a first message to initiate switching of the data path from the source base station to the target base station; and receiving a second message indicating completion of the switching of the data path.

4. The method of claim 3, wherein the starting the timer comprises starting the timer upon receiving a first new packet for the UE from the gateway when it precedes receipt of the second message.

5. The method of claim 3, wherein the first message comprise a Handover Complete message and the second message comprises a Handover Complete Acknowledgement (Ack) message.

6. The method of claim 3, wherein the first message comprise a Path Switch Request message and the second message comprises a Path Switch Request Acknowledgement (Ack) message.

7. The method of claim 1, further comprising:

sending the forwarded packets to the UE without waiting for expiration of the timer; and sending the new packets to the UE after expiration of the timer.

8. The method of claim 1, further comprising:

discarding forwarded packets received after expiration of the timer.

9. The method of claim 1, further comprising:

sending forwarded packets received after expiration of the timer to the UE if no new packets have been sent to the UE.

10. The method of claim 1, further comprising:

receiving from the source base station the end marker packet indicating no more packets to forward to the target base station; and sending the new packets to the UE after terminating the timer.

11. The method of claim 1, wherein the forwarded packets from the source base station and the new packets from the gateway comprise Packet Data Convergence Protocol (PDCP) service data units (SDUs) or Internet Protocol (IP) packets.

12. The method of claim 2, wherein the forwarded packets and the new packets are for delivery to the UE.

13. The method of claim 1, further comprising:

dynamically updating a value for the timer as follows:

$$T(k) \quad \{ = T(k-1) + \Delta_{UP} \text{ if } D(k) > T(k-1)$$
$$\{ = T(k-1) - \Delta_{DN} \text{ if } D(k) \leq T(k-1)$$

Where:

$D(k)$ is a delay of a last packet forwarded by the source base station for a k-th handover to the target base station, $T(k)$ is the timer value after the k-th handover, and $\Delta_{UP}$ is an up step and $\Delta_{DN}$ is a down step for adjusting the timer value.

14. The method of claim 13, wherein:

$$\Delta_{DN} = \Delta_{UP}((100-Q)/Q)$$

Where:

Q is a percentage of handovers in which last forwarded packets are received before expiration of the timer.

15. An apparatus for wireless communication, comprising:

at least one processor configured to participate in handover of a user equipment (UE) from a source base station to a target base station, to determine a value for a timer based on at least one of load on a first interface between the source base station and the target base station, load on a second interface between the source base station and a gateway, load on a third interface between the target base station and the gateway, information for last forwarded packets for prior handovers of other UEs, and quality-of-service (QoS) profile of data being sent to the UE, to start the timer after a data path from the gateway to the UE has been switched from the source base station to the target base station, to receive forwarded packets for the UE from the source base station, to receive new packets for the UE from the gateway, to send forwarded packets received prior to expiration of the timer to the UE before any new packets, and to terminate the timer upon receiving an end marker packet from the source base station.

16. The apparatus of claim 15, wherein the at least one processor is configured to send a first message to initiate switching of the data path from the source base station to the target base station, to receive a second message indicating completion of the switching of the data path, and to start the timer upon receiving a first new packet for the UE from the gateway when it precedes the second message.

17. The apparatus of claim 15, wherein the at least one processor is configured to send the forwarded packets to the UE without waiting for expiration of the timer, and to send the new packets to the UE after expiration of the timer.

18. The apparatus of claim 15, wherein the at least one processor is configured to receive from the source base station the end marker packet indicating no more packets to forward to the target base station, and to send the new packets to the UE after terminating the timer.

19. An apparatus for a target base station of a wireless communication system, comprising:

means for determining a value for a timer based on at least one of load on a first interface between a source base station and the target base station, load on a second interface between the source base station and a gateway, load on a third interface between the target base station and the gateway, information for last forwarded packets for prior handovers of other UEs, and quality-of-service (QoS) profile of data being sent to a UE;

means for starting the timer after a data path from the gateway to the UE of the wireless communication system has been switched from the source base station to the target base station during a handover of the UE;

means for receiving forwarded packets for the UE from the source base station;

means for receiving new packets for the UE from the gateway;

means for sending forwarded packets received prior to expiration of the timer to the UE before any new packets; and means for terminating the timer upon receiving an end marker packet from the source base station.

20. The apparatus of claim 19, further comprising:
means for sending a first message to initiate switching of the data path from the source base station to the target base station;
means for receiving a second message indicating completion of the switching of the data path; and
means for starting the timer upon receiving a first new packet for the UE from the gateway when it precedes receipt of the second message.

21. The apparatus of claim 19, further comprising:
means for sending the forwarded packets to the UE without waiting for expiration of the timer; and
means for sending the new packets to the UE after expiration of the timer.

22. The apparatus of claim 19, further comprising:
means for receiving from the source base station the end marker packet indicating no more packets to forward to the target base station; and
means for sending the new packets to the UE after terminating the timer.

23. A computer program product, comprising:
a non-transitory computer-readable medium comprising:
code for causing at least one computer to participate in handover of a user equipment (UE) from a source base station to a target base station,
code for causing the at least one computer to determine a value for a timer based on at least one of load on a first interface between the source base station and the target base station, load on a second interface between the source base station and a gateway, load on a third interface between the target base station and the gateway, information for last forwarded packets for prior handovers of other UEs, and quality-of-service (QoS) profile of data being sent to the UE;
code for causing the at least one computer to start the timer after a data path from the gateway to the UE has been switched from the source base station to the target base station,
code for causing the at least one computer to receive forwarded packets for the UE from the source base station,
code for causing the at least one computer to receive new packets for the UE from the gateway,
code for causing the at least one computer to send forwarded packets received prior to expiration of the timer to the UE before any new packets; and
code for causing the at least one computer to terminate the timer upon receiving an end marker packet from the source base station.

24. The computer program product of claim 23, the computer-readable medium further comprising:
code for causing the at least one computer to send a first message to initiate switching of the data path from the source base station to the target base station,
code for causing the at least one computer to receive a second message indicating completion of the switching of the data path, and
code for causing the at least one computer to start the timer upon receiving a first new packet for the UE from the gateway when it precedes receipt of the second message.

25. The computer program product of claim 23, the computer-readable medium further comprising:
code for causing the at least one computer to send the forwarded packets to the UE without waiting for expiration of the timer, and
code for causing the at least one computer to send the new packets to the UE after expiration of the timer.

26. The computer program product of claim 23, the computer-readable medium further comprising:
code for causing the at least one computer to receive from the source base station the end marker packet indicating no more packets to forward to the target base station, and
code for causing the at least one computer to send the new packets to the UE after terminating the timer.

* * * * *